(12) United States Patent
Bartilson

(10) Patent No.: US 8,100,216 B2
(45) Date of Patent: Jan. 24, 2012

(54) HYBRID DRIVETRAIN WITH WASTE HEAT ENERGY CONVERSION INTO ELECTRICITY

(76) Inventor: Bradley Wayne Bartilson, Rolla, MO (US)

( * ) Notice: Subject to any disclaimer, the term of this patent is extended or adjusted under 35 U.S.C. 154(b) by 687 days.

(21) Appl. No.: 11/686,935

(22) Filed: Mar. 15, 2007

(65) Prior Publication Data

US 2008/0223632 A1 Sep. 18, 2008

Related U.S. Application Data

(63) Continuation-in-part of application No. 11/686,314, filed on Mar. 14, 2007, now Pat. No. 7,808,214, which is a continuation-in-part of application No. 11/613,014, filed on Dec. 19, 2006, now Pat. No. 7,642,755.

(51) Int. Cl.
  *B60K 13/04* (2006.01)
(52) U.S. Cl. ........................................ 180/309; 180/68.3
(58) Field of Classification Search ............... 180/68.1, 180/68.2, 68.3, 310, 309, 65.21; 62/232.1, 62/3.7, 238.4; 60/650, 597, 618, 659; 136/236.1, 136/205, 238, 239
  See application file for complete search history.

(56) References Cited

U.S. PATENT DOCUMENTS

| | | | |
|---|---|---|---|
| 1,032,544 A | 7/1912 | Hess et al. | |
| 3,061,031 A | 10/1962 | Packard | |
| 3,899,359 A * | 8/1975 | Stachurski | 136/205 |
| 4,045,075 A | 8/1977 | Pulver | |
| 4,087,106 A | 5/1978 | Winchell | |
| 4,148,192 A | 4/1979 | Cummings | |
| 4,215,553 A * | 8/1980 | Poirier et al. | 60/650 |
| 4,215,735 A | 8/1980 | Sato | |
| 4,489,242 A | 12/1984 | Worst | |
| 4,662,467 A | 5/1987 | Arai et al. | |
| 4,715,192 A * | 12/1987 | Katz | 62/323.1 |
| 4,732,819 A | 3/1988 | Komuro | |
| 4,752,697 A * | 6/1988 | Lyons et al. | 290/2 |
| 4,910,414 A * | 3/1990 | Krebs | 62/238.4 |
| 5,116,069 A | 5/1992 | Miller | |
| 5,401,056 A | 3/1995 | Eastman | |
| 5,495,905 A | 3/1996 | Fini, Jr. | |
| 5,729,463 A | 3/1998 | Koenig et al. | |
| 5,857,336 A | 1/1999 | Paul et al. | |
| 5,910,722 A | 6/1999 | Lyons et al. | |
| 5,934,395 A | 8/1999 | Koide et al. | |
| 5,998,885 A | 12/1999 | Tamor et al. | |
| 6,118,237 A | 9/2000 | Kikuchi et al. | |
| 6,265,851 B1 | 7/2001 | Brien et al. | |
| 6,394,209 B1 | 5/2002 | Goehring et al. | |

(Continued)

FOREIGN PATENT DOCUMENTS

WO   WO 2005/078892   8/2005

*Primary Examiner* — Hau Phan
(74) *Attorney, Agent, or Firm* — Woodcock Washburn LLP

(57) ABSTRACT

A thermal-to-electrical conversion system converts internal combustion engine exhaust heat into useful electrical energy in a hybrid vehicle system. The converted energy is sent to an energy-storage control system via a DC-DC converter. High power-density storage medium (e.g. ultracapacitors) is used in the designated "short-cycle" hybrid design to maximize transfer efficiency and capacity while minimizing weight. An upconversion circuit within the control system allows high use of the storage capacity. Employed in a lightweight vehicle platform, the system addresses the most significant barriers to achieving high transportation efficiency-mass and combustion energy loss to waste heat.

14 Claims, 7 Drawing Sheets

U.S. PATENT DOCUMENTS

| | | |
|---|---|---|
| 6,437,544 B1 | 8/2002 | Yang |
| 6,449,554 B2 | 9/2002 | Yamawaki |
| 6,464,026 B1 | 10/2002 | Horsley et al. |
| 6,533,007 B1 | 3/2003 | McMannis |
| 6,605,773 B2 | 8/2003 | Kok et al. |
| 6,651,433 B1 * | 11/2003 | George, Jr. ............... 60/618 |
| 6,724,100 B1 | 4/2004 | Gabriel |
| 6,876,098 B1 | 4/2005 | Gray, Jr. |
| 6,941,990 B2 | 9/2005 | Rooney |
| 6,994,360 B2 | 2/2006 | Kuang et al. |
| 7,004,273 B1 | 2/2006 | Gruenwald et al. |
| 7,068,017 B2 | 6/2006 | Willner et al. |
| 7,078,877 B2 | 7/2006 | Salasoo et al. |
| 7,086,017 B1 | 8/2006 | Bloom |
| 7,100,369 B2 | 9/2006 | Yamaguchi et al. |
| 7,104,060 B2 * | 9/2006 | Ogawa et al. ............. 60/597 |
| 7,109,408 B2 * | 9/2006 | Kucherov et al. .......... 136/205 |
| 7,109,686 B2 | 9/2006 | Schulte et al. |
| 7,111,465 B2 | 9/2006 | Bell |
| 7,138,730 B2 | 11/2006 | Lai |
| 7,152,866 B2 | 12/2006 | Chalin et al. |
| 7,248,030 B2 | 7/2007 | Yoshino |
| 7,370,480 B1 * | 5/2008 | Balzano ..................... 62/3.7 |
| 7,642,755 B2 | 1/2010 | Bartilson et al. |
| 7,807,917 B2 * | 10/2010 | Atanackovic ............. 136/236.1 |
| 2003/0042866 A1 | 3/2003 | Minamiura et al. |
| 2004/0100149 A1 | 5/2004 | Lai |
| 2005/0074645 A1 | 4/2005 | Fattic |
| 2005/0204733 A1 | 9/2005 | Sasaki |
| 2005/0204762 A1 | 9/2005 | Sasaki |
| 2006/0000651 A1 | 1/2006 | Stabler |
| 2006/0237242 A1 | 10/2006 | Burke |
| 2007/0181355 A1 | 8/2007 | Harris |
| 2008/0142282 A1 | 6/2008 | Bartilson et al. |
| 2008/0223637 A1 | 9/2008 | Bartilson et al. |

* cited by examiner

HYBRID DRIVETRAIN WITH WASTE HEAT ENERGY CONVERSION INTO ELECTRICITY

CROSS-REFERENCE TO RELATED APPLICATIONS

This application is a continuation-in-part of U.S. patent application Ser. No. 11/686,314, filed Mar. 14, 2007 now U.S. Pat. No. 7,808,214, which is a continuation-in-part of U.S. patent application Ser. No. 11/613,014, filed Dec. 19, 2006 now U.S. Pat. No. 7,642,755. The content of each of the above-referenced applications are incorporated by reference herein in its entirety.

TECHNICAL FIELD

The present invention relates to an apparatus and method to efficiently extract waste thermal heat from a heat engine powering a vehicle with a hybrid drivetrain.

BACKGROUND

The opportunity afforded by improving the thermal efficiency of internal combustion engines (ICE) (commonly 28% for gasoline, 34% for diesel engines) is well understood, however long-standing research and development efforts have not produced marked technical and/or market impacts. Turbo-charging and ceramic insulation of combustion chamber components have made the most significant impact, however, cost and the extent of efficiency improvement (~10%), has not led to a significant reduced fuel consumption on a functional work unit basis, and accordingly not impacted the per capita basis. Exhaust gas turbines with mechanically-connected generators have been presented as alternative, however, cost and efficiency have similarly pre-empted commercialization. Thermal-to-Electric devices and systems have also been presented to capture the waste stream energy, however, the device efficiencies for prior thermoelectric and thermionic cases, have been very low (<10%), limiting the use to lesser power applications. Efficient use of prior devices were also limited to very high temperatures, typically requiring >700° C. The design of the thermal transfer system encapsulating the thermoelectric or thermionic devices have lacked adequate transfer surface and residence time, resulting in reduced energy extraction from the bulk stream.

In the case of transportation vehicles, having proliferated a high-mass (high load) basis contributes to the magnitude of the loss, and increases the magnitude and cost of thermal recovery options. Higher fuel prices have inspired the market for vehicles with hybrid drivetrains (ICE assisted by a generator (s) with energy storage system, yet the approximate 70% wasting of exhaust energy continues in these systems as well.

U.S. Pat. No. 4,148,192 describes a "parallel" internal combustion electric hybrid powerplant having thermoelectric devices positioned in such manner as to receive heat energy from the engine exhaust and deliver electrical energy to the system's battery. The thermal conversion elements are attached to the exterior surfaces of the exhaust pipe and the cylinder walls.

U.S. Pat. No. 4,489,242 Discusses the use of a stored energy system to provide the necessary energy for operation of a vehicle's accessories, and includes a suggestion for an exhaust-driven thermoelectric unit, amongst a multitude of options (without detail sufficient to build or determine viability of such an approach).

Laid-open application US2006/0000651 describes the same invention of the former 4,148,192

U.S. Pat. No. 5,857,336 Describes an exhaust-driven turbo-assisted positive displacement engine for a hybrid electric vehicle, and having a second exhaust passage with another turbine which mechanical turns a (mechanical) generator to recover additional energy when the waste-gate bypasses the first turbo.

U.S. Pat. No. 7,100,369 describes a thermoelectric device system extracting heat from the exhaust stream of an engine having a primary and secondary exhaust passages and control valves operated based upon engine load for optimization.

U.S. Pat. No. 6,605,773 presents a thermoelectric generator for a fuel-cell power plant of a vehicle, having a thermally-activated regulator controlling the heat source (fuel cell) and/or the cooling medium to the generator, thereby eliminating the cost and complexity of a DC-DC converter.

U.S. Pat. No. 7,068,017 describes a source regulation (impedance transformation) electrical system used to increase the efficiency of power transfer from a direct energy source (one example, of many, and not described with sufficient detail as to allow construction or viability) being a thermoelectric or thermionic device) to the load.

U.S. Pat. No. 7,111,465 presents improved thermoelectric generator design by thermal isolation of thermoelectric devices in an array. Laid-open application US200510204762 presents a thermoelectric generation system interfaced to the combustion exhaust stream via a heatpump with liquid circulation system having an endothermic reaction.

Laid-open application US200510204733 presents the invention of the former US2005/0204762 with the introduction of the catalytic treatment of the exhaust, and options for integration and optimization with the thermoelectric system.

Laid-open application US200510074645 describes a thermoelectric generating system capturing heat from a solid oxide fuel cell, the generating system having a vacuum enclosure surrounding the thermoelectric devices (for thermal isolation).

The opportunity presented by thermoelectric capture of waste energy is best extracted when applied to an efficient vehicle and hybrid drive system. A strong relationship has been established between vehicle weight and fuel efficiency (EPA data: 1 gallon/100 miles/900 pounds), implying that vehicle weight, and the hybrid drive system itself, must be weight conscious to offer marked improvement (FIG. 8) (present invention performance marked as "ES 1". Not surprisingly, today's hybrids offer only minor improvement in fuel efficiency over non-hybrids, as they leverage the same heavyweight automobile platform with the additional weight of hybrid components. In particular battery-based storage systems are comparatively low in power density (200 to 400 Wkg for today's advanced types), yet high in energy density (200 W-hrkg). In addressing the power demands and overcoming poor charge and discharge efficiencies (70-90% dependent upon technology and state-of-charge (SOC)), battery mass becomes a significant weight contributor. Excessive energy storage has led to hybrid designed for long cycle times (lengthy discharge and charge times).

The inability of batteries to charge and discharge at high rates and high efficiencies, has been an impetus to augment the storage with higher power density medium, e.g. ultracapacitors (~6000 W/kg) for the high rate conditions. Unfortunately the combination of batteries and ultracapacitors brings about other limitations, as well as added costs, complexity and reduced reliability. For a series combination of batteries and ultracapacitors, the battery limits the current rate, so little improvement in charge/discharge rate occurs. When used in parallel, the ultracapacitors, whose characteristic voltage change is stronger than the battery for a given charge/discharge rate, the battery limits the capacity use. A pure ultracapacitor storage solution was not envisioned for automobile application, as ultracapacitors are too low in energy storage (<10 W-hr/kg) to accommodate the mass-driven requirements of the current automobile platform.

Others have identified approaches with switched banks of UC's, or in combination with batteries, to avert the extreme voltage reduction that would be experienced by continuing to draw from a single UC. However, this methodology results in significant underutilization of the capability of the UCS (typically less than 50% as voltage input variations are limited to 2:1 for many devices). The additions of banks (either battery or UC) bring increased switching components/complexity, efficiency loss, increased weight (reducing vehicle efficiency) and cost.

U.S. Pat. No. 6,265,851 describes an electric vehicle power system for a semiconductor wafer handling application, having ultracapacitors and batteries as parallel sources connected to a source-selecting switch and having said switch direct its output only to a DC-DC converter which serves the motor load, however, this incurs the converter losses when no conversion is necessary.

Laid open US Pat App. US 2004/0100149 describes topologies for multiple energy sources, including UCs, and accommodates reverse power flow from the utility being driven (case of regenerative braking for a transportation vehicle). In the described topologies, all power is continuously directed through a power converter module, with inherent losses and limitations per device sizing.

U.S. Pat. No. 7,004,273 discusses a bank of ultracapacitors directly bussed to an engine-driven generator with a control management unit bringing the engine on and off to maintain the state-of-charge of the ultracapacitors. This approach does not address the inefficient ultracapacitor capacity utilization issue, resulting in extensive burden/cycling of the engine and/or significant oversizing of the ultracapacitor bank.

U.S. Pat. No. 7,109,686 describes the use of braking resistor and switch structure to assist in charging and discharging an ultracapacitor bank and to protect the ultracapacitor from excessive pre-charge current. A DC-DC converter is referenced as expensive, and its use is referenced only as an alternative method to pre-charge the ultracapacitor bank. While low in cost the use of the braking resistor diverts energy, thereby wasting said energy.

A solution which could extract more of an ultracapacitor's capacity would greatly assist in reducing wasted capacity and enable an all-ultracapacitor storage solution for a lightweight vehicle. Augmentation with thermal-to-electric recovery of waste heat furthers this potential.

SUMMARY

Large-scale improvement in the transfer of combustion energy into useful work has heretofore remained elusive. The apparatus and method of this invention contributes significant advancements over the background art as demonstrated in the following objects.

An object of the invention is to extract a significant amount of waste energy available from the ICE through higher device (>15%) and transfer system efficiency, and to perform this extraction down to a much lower temperature (<200° C.).

Another object of this invention is to provide an electrical storage system which accepts high and variable rates of charge transfer, exhibits high efficiency, high reliability over many cycles, and high capacity utilization.

Another object of this invention is to effect a low-complexity, "no moving parts", solid-state transfer system, exhibiting low cost, and high reliability.

Another object of the invention is to create a low-mass design, thereby incurring minimal added weight burden to a high efficiency transportation vehicle.

Another object of the invention is to reduce or eliminate the requirement for noise abatement from the exhaust system.

Additional objects and advantages of the invention are advanced by the following description and may also be learned from the practice of the invention.

In brief summary, the foregoing objects are achieved by an apparatus which comprises: a low-mass hybrid drivetrain having an ICE operating at a peak efficiency point, with exhaust stream directed through a compact heat exchanger housing high efficiency thermoelectric elements in a planar array, with electrical output of the array directed into a wide input span DC-DC converter serving power to a high power density storage system with high capacity utilization circuitry.

BRIEF DESCRIPTION OF THE DRAWINGS

The appended drawings depict specific embodiments of the described invention as to render understanding of the invention, however, they are not to be considered limiting of the scope of the invention. The drawings illustrate only typical, and presently understood, best use mode of the invention.

DETAILED DESCRIPTION OF ILLUSTRATIVE EMBODIMENTS

Figure 1:
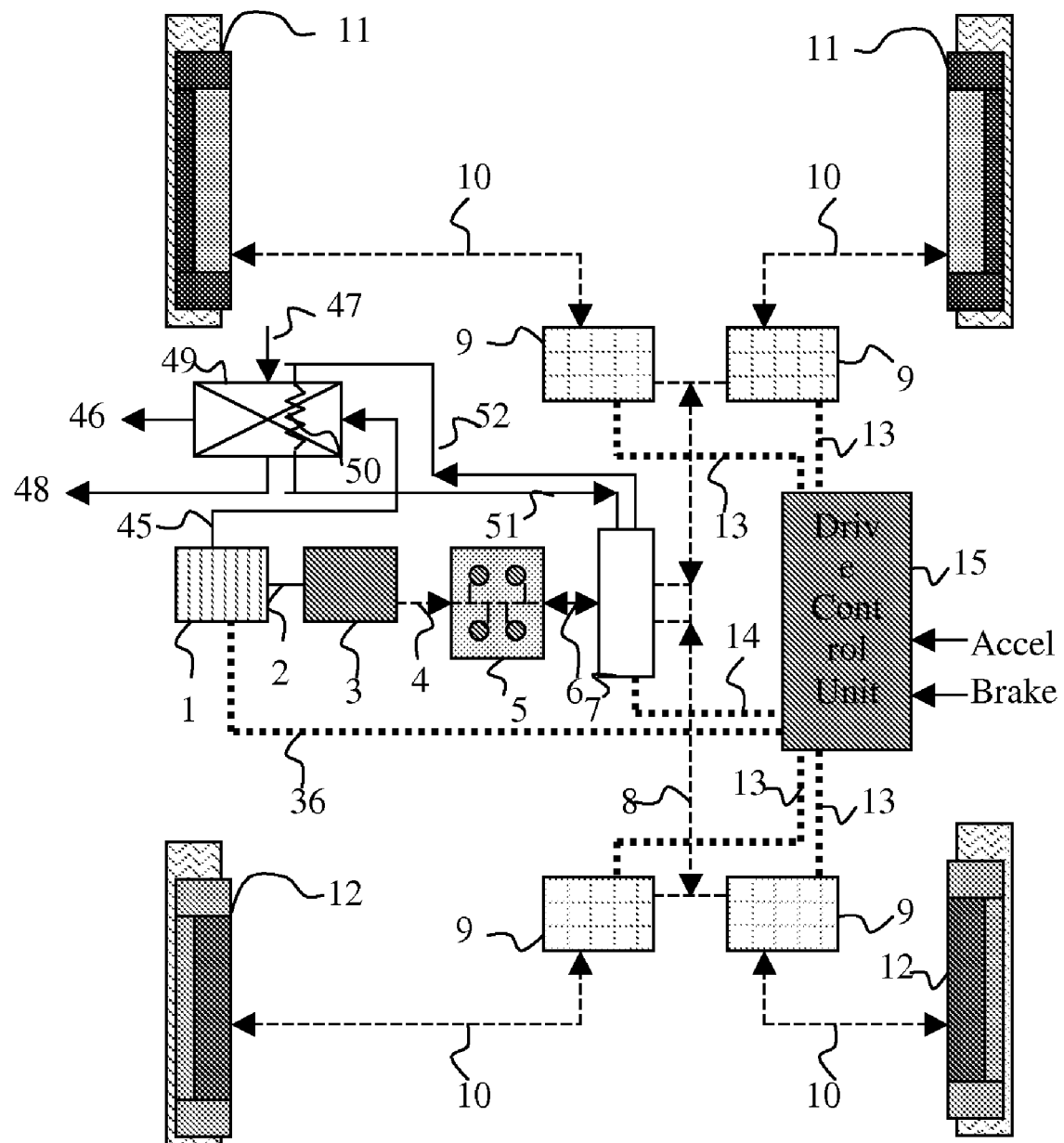
FIG. 1 is a schematic of a hybrid vehicle drivetrain and control system

The present invention embodies a serial hybrid drivetrain for a lightweight vehicle consisting of an ICE and directly-coupled generator serving power to electric motors that provide rotational power to the vehicle's wheels, with said ICE having its exhaust directed through a heat exchanger housing modules which transform exhaust heat into electricity which is made available to the ESS system, and said generator alternately or in parallel providing power to restore energy to the ESS, with said ESS system configured to provide power directly to the said electric motors, with said ESS having a single energy storage medium of high power density (>1000 W/kg), and having a high cycle life (>500,000 cycles to a deteriorated state of 80% capacity recharge level), and accepting charge rates of the maximum of charge rates from the ICE/generator and/or regenerative braking from the electric motors, and the sizing and charge/discharge efficiency of said ESS system such that excess storage and corresponding wasted "carrying" energy is minimized, and said serial hybrid drivetrain operated by a compatible control system which operates the engine at its peak efficiency point (FIG. 1).

Under the stated conditions of low vehicle mass, high storage power density and minimized energy storage, higher vehicle fuel efficiency is obtained, with a resulting shorter duration, higher-frequency of on and off cycling (herein labeled "short cycling") of the ICE and depletion/replenishment of the ESS than is obtained with current low power density storage mediums (batteries for example) and their combinations with high density mediums. Recovery of thermal energy from the exhaust stream furthers fuel efficiency, as well as increasing the total power output capacity.

In the preferred embodiment of the present invention high efficiency (>95% efficiency units are currently available) brushless DC motors (also referred to as AC synchronous motors driven at variable frequency via DC-AC motor controller) drive the wheels. As displayed in FIG. 1, the motors may be located in the wheel housing (called a wheel-motor) thus eliminating mechanical drive shaft and differential components. Operated via motor controller having "4-quadrant" control, the brushless DC motors and controllers permit the capture of regenerative braking energy to flow back to the ESS. Alternate motor and mechanical drive configurations are displayed in FIGS. 5, 6, and 7. While incurring additional cost, the option of driving of all vehicle wheels with motors enables higher capture of regenerative braking energy.

Figure 2:
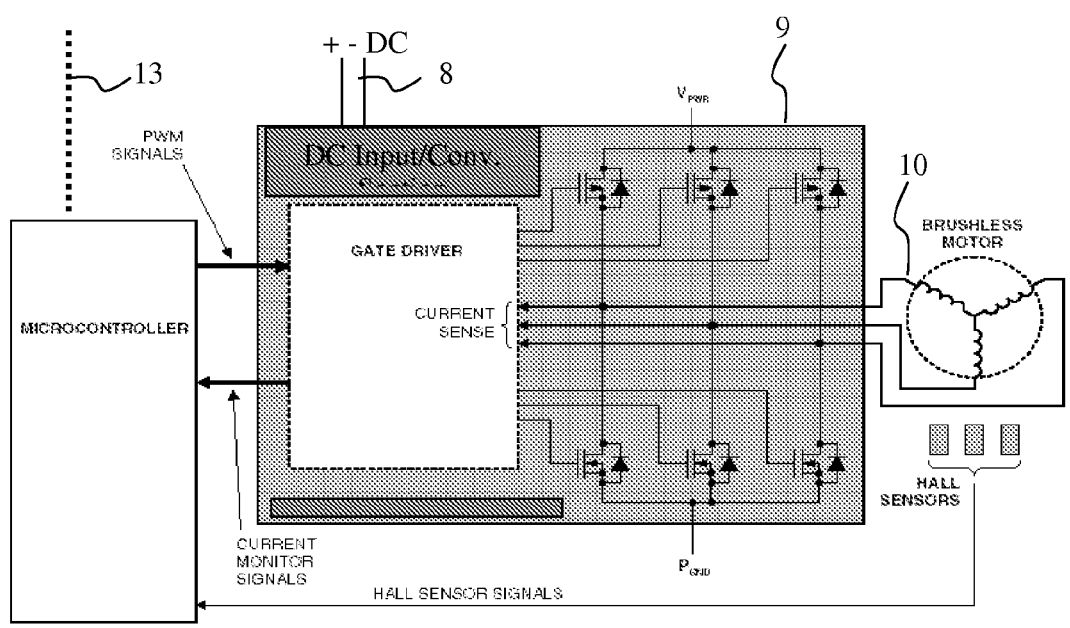
FIG. 2 is an example of a brushless DC motor drive

In the preferred embodiment of the present invention (reference FIG. 1), an ICE 1 drives a high efficiency generator 3 via a shaft 2 which delivers DC power to the UC storage 5 via electrical connections 4. Sequencing (on/off, durations) of the ICE 1 is controlled by the drive control system 15 via connection 36. The ESS control system 7 controls power flow between the UCS 5 via connection 6 and the loads (4 quadrant brushless DC motor controllers 9) via connection 8. A micro controller within the brushless DC motor controller creates PWM (pulse width modulated) signals to gate drivers which in turn pulse high current transistors that in turn provide the multi-phased, pulsed power to the DC brushless motors 11 and 12 via connection 10 (FIG. 2). Control of the brushless DC motor controllers is provided via connection 14 to the Drive Control Unit 15. Under braking signal from the vehicle driver, the drive frequency is decreased below that of the rotating motors 11 and 12, inducing reverse current flow which is then converted back to DC power and fed onto the UCS 5.

Figure 3:
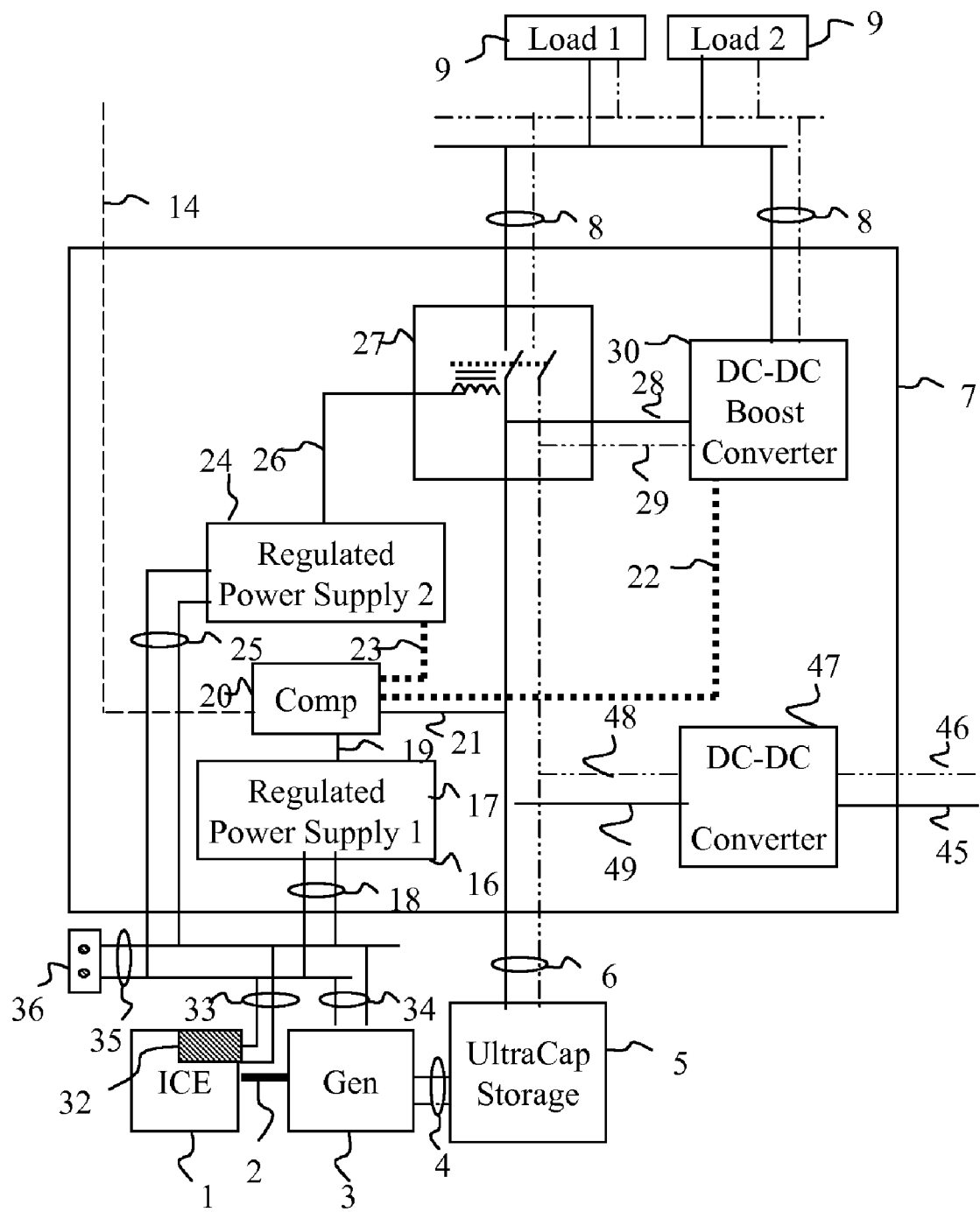
FIG. 3 is a schematic of the ESS control system with heat recovery input

As illustrated in FIG. 3, a Comparator Circuit 20 monitors the high voltage side of the bus via connector 21. When the feed bus voltage falls beneath a threshold value the Comparator 20 releases the inhibit signal line 22 inducing the on-state of the DC-DC Boost Converter 30. Bus Connections 28, 29 supply power to the DC-DC Converter 30 which is connected to common terminals of the Contactor 27. Contactor 27 is in a normally-closed condition when the UCS bus 6 voltage is above the low-voltage threshold previously described. Under low voltage conditions, Comparator 20 releases an inhibit release signal via connection line 23 to a regulated supply 24 which energizes the coil of Contactor 27, thus directing all power flow from the UCS 5 to the DCDC Converter 30 for up-conversion to the requisite output voltage required by the load. Connection lines 8 (from the Contractor 27) direct power to the common load bus under the NC state of Contactor 27, whereas power is directed via connection lines 8 from the DC-DC Converter output under the case of low UCS bus voltage. A delay corresponding to the known response time of the DC-DC converter ensures that opening of Contactor 27 connection to the output bus lines 6 does not cause momentary sagging of the ESS output voltage (alternative control designs may equivalently serve to ensure smooth operation of the ESS output bus during switching). A Regulated Power Supply 17 is connected to the battery bus via connection lines 18, to provide controlled, logic level power supply to the Comparator 20. Regulated Power Supply 24 provides a controlled DC level to operate the coil in Contactor 27, also supplied by the battery 36. Power sourced from the waste heat recovery "generator" 49 by summation of thermoelectric (or thermionic) modules 50 is delivered to DC-DC Converter 47 via connecting lines 45, 46. Power is then given to the UCS bus 6 via connecting lines 48, 49 for system use (storage or load-serving). Converter 47 serves to convert and condition "generator" 49 input voltage, as well as to isolate "generator" 49 from UCS bus 6 (prevent reverse power flow). Starting of the ICE 1 is accomplished by an electric starter motor 32. A 12 VDC battery 36 has as its sole function to provide power to the starter motor 32, and control circuits within the ESS control system 7 and Drive Control Unit 15. The battery 32 capacity is maintained by a separately regulated output from the generator 3 via connection lines 34.

Figure 4:
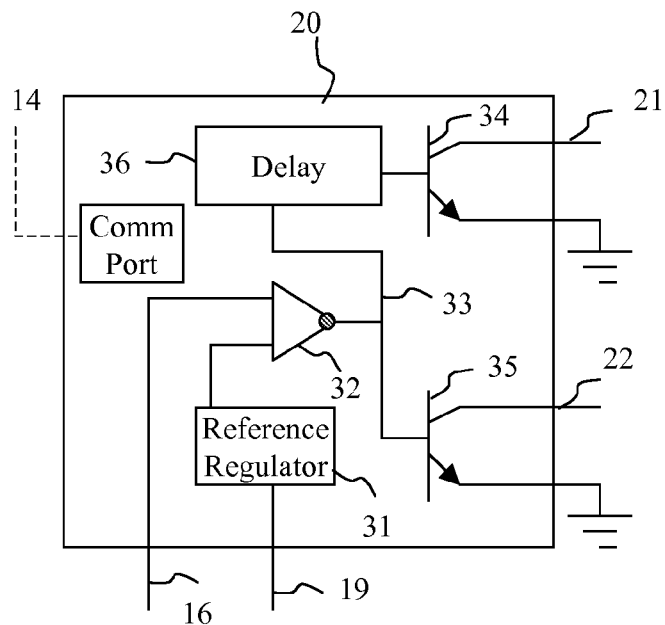
FIG. 4 is a schematic of the comparator circuit of the ESS control system

FIG. 4 displays the Comparator Circuit 20 wherein connection line 19 receives regulated power from Regulated Power Supply 17, delivering controlled logic-level voltage as reference input to the low-side of the Comparator 37 via the Reference Regulator 31. Connection line 21 provides the voltage sense input to the Comparator 37 from UCS bus 6. When the difference between the Comparator 37 inputs falls beneath the threshold value, connection line 38 energizes Power Transistor 41 sending the inhibit release signal to the DC-DC Converter 30 via connection line 22. Connection line 38 also activates the Delay 39 which activates Power Transistor 40 (after its prescribed delay, or similar control function) which, via connection line 23 enables Regulated Power Supply 24, which then powers the coil in the Contactor 27 via connection line 26.

In an example case of a 48V system bus, a single Maxwell BMOD00165-E048 Ultracapacitor provides 5 0Watt-hr of capacity, a discharge rate maximum of 93 kW and maximum short circuit current of 4800 Amps. A Curtis Albright SW1000A DC contactor affords 1000A expected maximum application requirements, and consumes 30 W of coil power when activated. American Power Design's H30 DC-DC converter supplies the Contactor coil power over the wide range of input voltage. A Dallas Semiconductor Max5090A affords regulated 3.3V power to the National Semiconductor LM139 comparator over an input voltage range of 6.5 to 76V. A Logic level, 5V signal from LM139 drives power transistor VN02NSP by STMicroelectronics, enabling the DC-DC converter 24 and the delay 26. A typical 48V brushless DC motor having 95% efficiency and a controller of similar efficiency exhibits a functional input range of 40 to 50 VDC and exhibits combined efficiency of 90%. When applied to single unit of the described UC, the UC output would be below the useable range of the motor controller in 1 second, when drawing at a 500 amp rate. Utilizing the prescribed apparatus of this invention and using available high-efficiency DC-DC converter technology having a 2:1 input range from 20-40 Volts, 500 amps could be then drawn for 5 additional seconds, an increase of 500%. The use of the upconversion device in only the lower voltage or state-of-charge condition averts the upconversion loss when not required. When such a system is in regenerative mode, the vehicle application controller signals the Comparator Circuit, closing the Contactor enabling reverse energy flow to the UCS. This all-UC based design permits full-rate regenerative braking energy flow from the wheel motor-generators, where other designs either waste the excess energy in heat, or require additional storage. In operational cases where the UCS is currently at a full SOC, additional UCS storage would also be required when regenerative braking energy becomes available, however, this is accommodated in design with a larger UCS system in the prescribed apparatus, and is more efficient in energy transfer and weight than a combined battery system, translating to higher vehicle efficiency.

Figure 5:
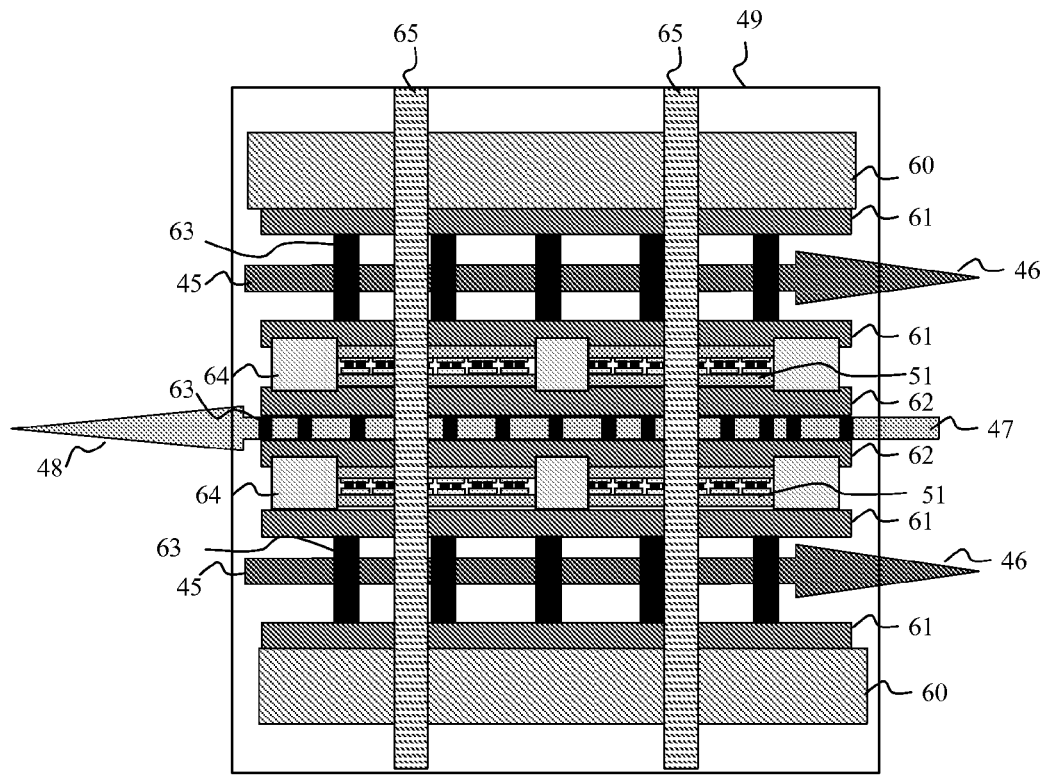
FIG. 5 is a crossectional view of the waste heat-to-electric conversion system
Figure 6:
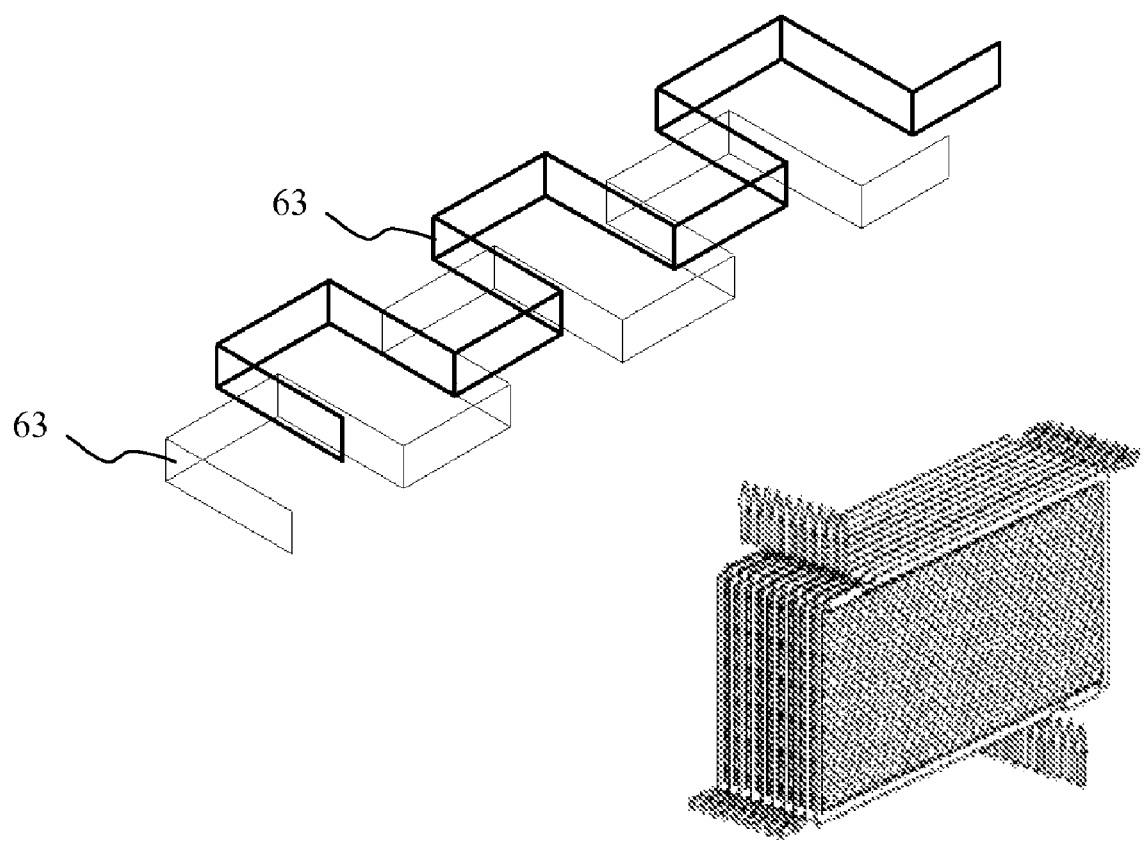
FIG. 6 illustrates the fin construction of the conversion system and the stacking of heat exchange layers into a complete unit

In the preferred embodiment of the invention, the waste heat-to-electric conversion system 49 shown in FIGS. 1 and 5 comprising hot fluid and cold fluid passages formed by plates 61 and alternating and fastened "fins" 63 which mechanically interconnect the plates 61 and provide extended heat transfer surface area, heat-to-electric modules (thermoelectric or thermionic, hereafter referred to as thermoelectric modules) which are held in thermal contact with hot and cold side plates in a stacked arrangement by mechanical fastening such as bolts 61 or other mechanical fastening means, insulation 64 to reduce heat transfer other than through the thermoelectric modules 51, and insulation 61 to reduce heat transfer from the outer channel to the ambient environment, generates electricity. Hot exhaust stream flow is ducted into, and out of, the conversion system 49 by manifolds 45 and 46 respectively. The circuitous exhaust stream flow path in the conversion system 49 also serves to dissipate exhaust stream audible noise (similar to a muffler). Fin stock is commonly obtained in bent form via large area forming dies and assembled with the plates to form a completed structure or subassembly as shown in FIG. 6. Coolant flow is ducted into the conversion system 49 by manifolds 47 and 48.

For the given case of the present invention, a 160 mile-per-gallon, 338 kg vehicle having an 18 hp (13.4 kW) diesel engine has an exhaust temperature is 400° C. Ducted air, having a maximum temperature of 70° C. is used as the coolant, and is extracted from the vehicle exterior to maintain the cold side temperature of the thermoelectric modules. For corrosion resistance, carbon steel is the selected construction material for exhaust stream-side plate and fin material, having a mean thermal conductivity of 47 W/m° K. Thermal analysis and geometrical optimization of compact heat exchangers are provided in heat transfer texts (reference 1) as:

$$Q = U \times A \times \text{LMTD}$$

Where
Q=total heat exchanged
U=overall heat transfer coefficient
A=exchanger surface area
LMTD=log mean temperature difference $$LMTD = \left(\frac{GTD - LTD}{\ln(GTD/LTD)}\right) \times CF$$

Where: GTD=larger of (T1−t2) or (T2−t1)
LTD=smaller of (T2−t1) or (T1−t2)
And fin geometries optimized by:

$$h = (J///t)^{0.66} \times (0.323) \times (D \times V \times L/Dv)^{0.5} \times D \times Cp \times J \text{ Where:}$$

h=Heat transfer coefficient
J=Velocity of the air past the fin
D=Air density
L=Length of the cooled surface in the direction of air flow
$D_v$=Dynamic viscosity
t=Thickness of the boundary layer
$C_p$=specific heat of the cooling air For the given condition, and in a counter-flow configuration (hot and cold fluids flow in opposing directions) an LMTD of 208° C. is obtained giving rise to 0.2 square meter of transfer area required using 1 millimeter thick plate material. Design considerations of exhaust back pressure (impact on ICE performance), fluid pumping power, and thermoelectric module area impact final design of channel size and number of channels. In the presented case, thermoelectric module size requirements drive the areal dimensions, per the following prescription.

Figure 7:
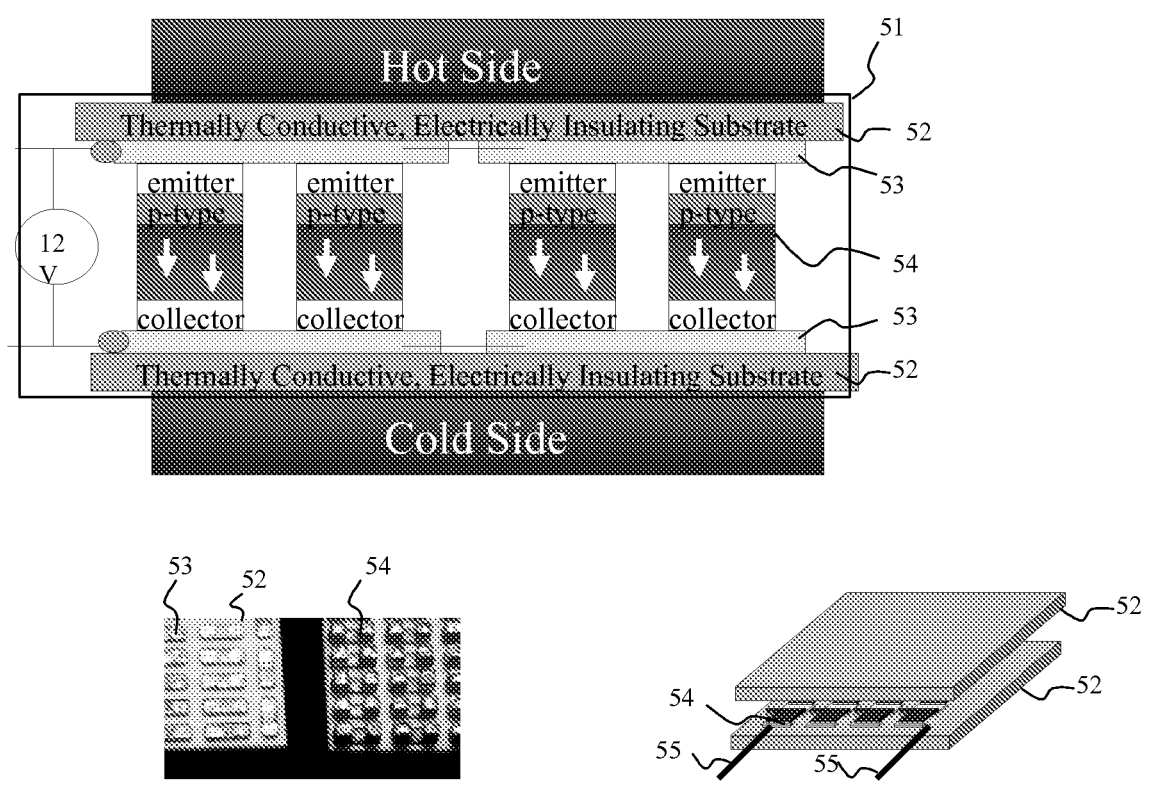
FIG. 7 illustrates the thermal-to-electric conversion module construction
Figure 8:
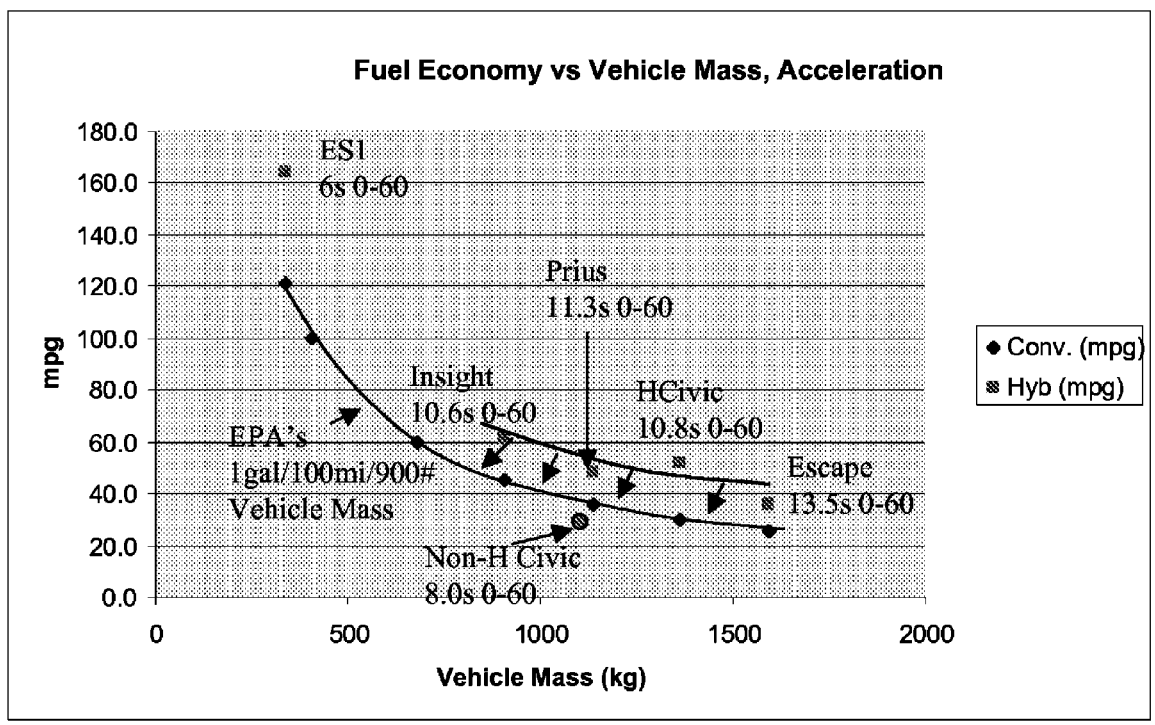
FIG. 8 is a graph of vehicle mass versus fuel efficiency

Heat-to-Electricity conversion is performed by thermoelectric modules 51 as displayed in FIG. 7 comprising individual thermoelectric devices 54 which are exposed to hot and cold surfaces on opposite sides through electrically-isolating and thermally conducting substrates 52. The individual thermoelectric devices 54 are electrically-interconnected by a conductive pattern 53 applied to substrates 52. An interconnection system 55 connects the multiplicity of modules 51 and carries the summary power to the ESS control system 7 (FIGS. 1, 3).

Illustrated in FIG. 7, advanced thermal diodes (reference U.S. Pat. No. 6,396,191) providing thermal conversion efficiency of 20% are of 2 square millimeters in area, and deliver 10 amps per a 2 diode stack, developing 80 mV when subjected to the stated thermal difference. A 12V module of dimension 30 mm×30 mm, delivers 120 Watts via a series connection of 150 diode stacks. 32 total modules connected serially in groups of 4 to provide 48V output and the groups then connected in parallel, provide extraction of 3.75 kW from the exhaust waste heat stream from the stated engine. Aluminum nitride (sintered) of 1 mm thickness is the substrate material (thermally conductive, electrically insulating). Construction consisted of substrate metallization and patterning, solder preform, diode placement and reflow. The modules are set into metallized (for oxidation control) locating recesses, in an array of 4×4 in the carbon steel plates, thus requiring 2 layers of modules as shown in FIG. 5. Refractory fiber high temperature insulation (thermal conductivity of 0.7 BTU-in./Hr. Ft2° F. in sheet form by Cotronics) surrounds the perimeter of modules to avert heat transfer other than through the thermoelectric modules.

Herein, the invention has been described with reference to specific embodiments, however, modifications and variations of the invention may be constructed without departing from the scope of the invention as it is defined in the following claims.

What is claimed is:

1. A solid-state thermal-to-electrical conversion system used in a vehicle comprising:
   a thermoelectric module including a thermoelectric device, wherein the thermoelectric module supplies energy from heat energy in electrical form, the heat energy received from an internal combustion engine exhaust system, an exhaust stream flow of the engine exhaust system is ducted into, and out of, the thermal-to-electrical conversion system by manifolds,
      wherein the thermoelectric module is connected serially in a group of at least two thermoelectric modules, the groups connected in parallel, and
      wherein exhaust stream flow path in the conversion system serves to dissipate exhaust stream audible noise; and
   a planar heat exchange system consisting of isolated hot and cold stream channels, with said channels inclusive of extended surface area, having the outside of said channels in contact with said modules.

2. The system of claim 1, further comprising an interconnection system that connects a multiplicity of modules and carries the summary power to an energy storage system (ESS) control system.

3. The system of claim 1, wherein the substrate is aluminum nitride.

4. The system of claim 3, wherein the substrate is approximately 1 mm thickness.

5. The system of claim 3, wherein the substrate is sintered aluminum nitride.

6. The system of claim 1, wherein the thermoelectric module is connected to a DC-DC conversion device for energy transfer to an energy storage system.

7. The system of claim 1, wherein the thermoelectric module is surrounded by refractory fiber high temperature insulation.

8. They system of claim 7, wherein the refractory fiber high temperature insulation has thermal conductivity of approximately 0.7 BTU-in./Hr. Ft2 OF.

9. The system of claim 1, wherein the thermoelectric module is placed in a metallized recess.

10. The system of claim 9, wherein the thermoelectric module is one of a set of two modules wherein the two modules create two layers of modules in the metalized recess.

11. The system of claim 9, wherein the modules are also placed in an array in carbon steel plates.

12. The system of claim 11, wherein the array is a square array.

13. A solid-state thermal-to-electrical conversion system extracting heat energy from an internal combustion engine's exhaust stream and supplying said energy, in electrical form, to an energy storage system employed in a serial hybrid drive for a vehicle of less than 680 kg mass, comprising:
the solid-state thermal-to-electrical conversion system comprising:
thermal-to-electrical conversion modules having thermal-to-electrical conversion devices attached and interconnected between two opposing planar substrates via a metallization pattern, with said substrates being thermally-conductive and electrically-isolating,
a planar heat exchange system consisting of isolated hot and cold stream channels, with said channels inclusive of extended surface area, having the outside of said channels in contact with the said modules,
a system electrically connecting said modules with a DC-DC Conversion device for energy transfer to an energy storage system; and
the serial hybrid drive comprising:
an internal combustion engine mechanically coupled to a generator,
an energy store system receiving power from said generator and power from regenerative braking, having a storage medium of high charge and discharge rate capability (>2000 W/kg), high charge and discharge efficiency (>90%) and high cycle lifetime (>500K cycles from 0 to 80% charge capacity), with said storage capacity (Watt-hours) less than 200 times that of a single acceleration event of the vehicle from 0-35 miles-per-hour,
an energy control system capable of depleting greater than 66% of the total stored energy capacity,
at least one motor controller and associated motor providing torque to one or more of wheels of said vehicle and which receive power from the energy store system and/or the generator, with said motor and controller transferring regenerative braking power to the energy store system under vehicle braking condition.

14. A solid-state thermal-to-electrical conversion system extracting heat energy from an internal combustion engine's exhaust stream and supplying said energy, in electrical form, to an energy storage system employed in a serial hybrid drive for a vehicle of less than 680 kg mass comprising:
the solid-state thermal-to-electrical conversion system comprising:
thermal-to-electrical conversion modules having thermal-to-electrical conversion devices attached and interconnected between two opposing planar substrates via a metallization pattern, with said substrates being thermally-conductive and electrically-isolating,
a planar heat exchange system consisting of isolated hot and cold stream channels, with said channels inclusive of extended surface area, having the outside of said channels in contact with the said modules,
a system electrically connecting said modules with a DC-DC Conversion device for energy transfer to an energy storage system; and
the serial hybrid drive comprising:
an internal combustion engine mechanically coupled to a generator,
an energy store system receiving power from said generator and power from regenerative braking, having a storage medium of high charge and discharge rate capability (>2000 W/kg), high charge and discharge efficiency (>90%) and high cycle lifetime (>500K cycles from 0 to 80% charge capacity), with said storage capacity (Watt-hours) less than 200 times that of a single acceleration event of the vehicle from 0-35 miles-per-hour,
an energy control system capable of depleting greater than 66% of the total stored energy capacity,
at least one motor controller and associated motor providing torque to one or more of wheels of said vehicle and which receive power from the energy store system and/or the generator, with said motor and controller transferring regenerative braking power to the energy store system under vehicle braking condition,
an up-conversion device providing voltage increase from input to its output terminals, a switching device enabling passage of the said combined storage output power directly to the external load bus, or to the up-conversion device, said up-conversion device having its output directed onto the external load bus, a system to control the operation of said switching device, a method of directly coupling said storage elements to the system load bus for direct power transfer from said storage components to the system load bus when the storage component voltage or state-of-charge is above a determined level, and then diverting the power flow from said storage components to an up-converting device to extract the remaining energy from the storage components when the said voltage is below said condition.

* * * * *